United States Patent Office 2,812,556
Patented Nov. 12, 1957

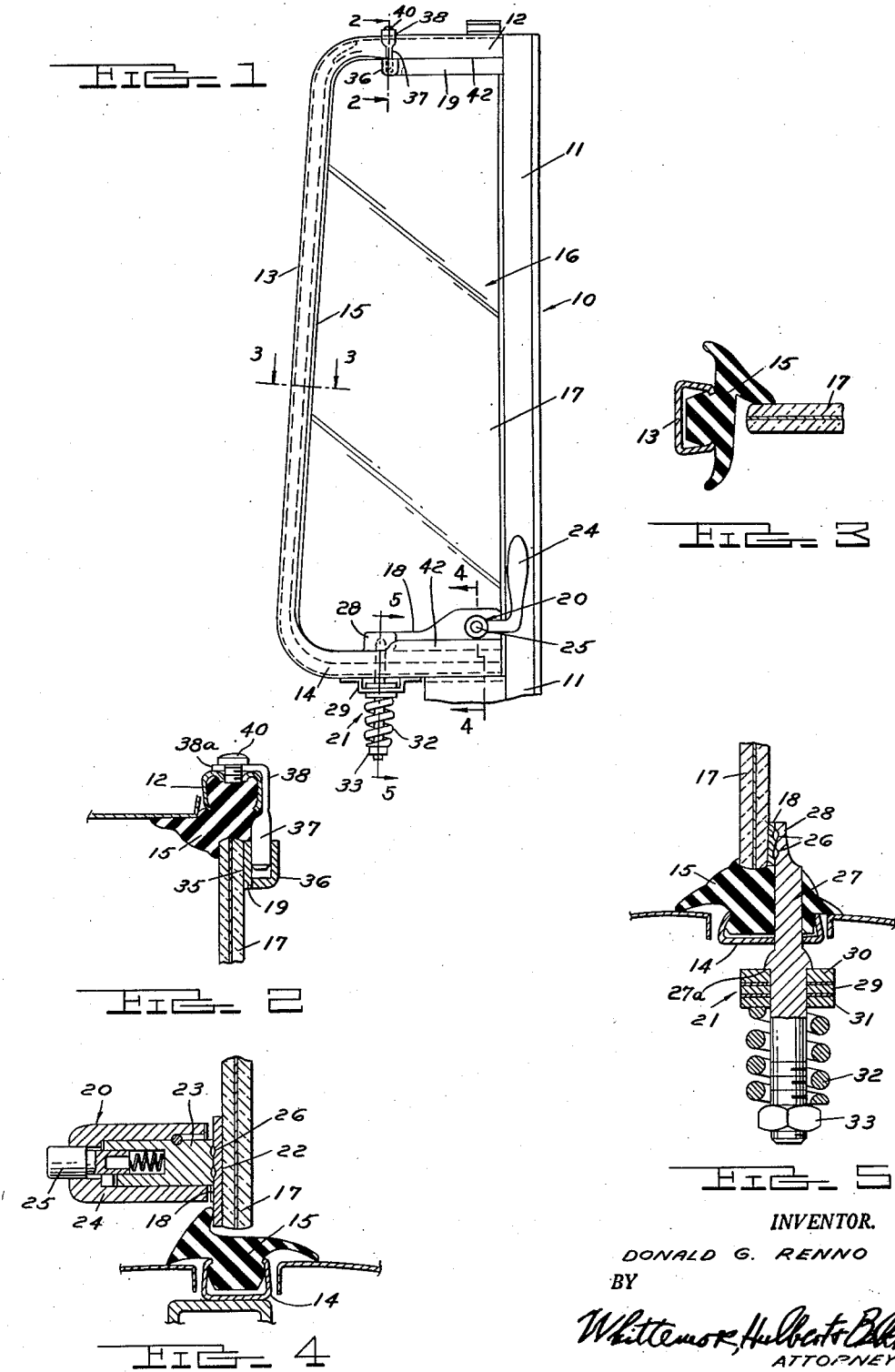

2,812,556

AUTOMOBILE VENTILATOR WINDOW CONSTRUCTION

Donald G. Renno, Birmingham, Mich., assignor to Motor Products Corporation, Detroit, Mich., a corporation of New York Application March 14, 1955, Serial No. 494,183

3 Claims. (Cl. 20—53)

The present invention relates to improvements in a ventilator window assembly for vehicle bodies.

It has been the custom in constructing ventilator windows of this type to apply a continuous, metal glass retainer channel about the entire length of the forward, top and bottom outer margins of a ventilator panel, with a non-metallic cementing and sealing strip interposed between the panel edge and the interior of the channel. This continuous channel functions as a support on the panel for pivot elements hinging the latter in its frame, as well as a support for a latching device which secures the panel in its closed position. However, it adds nothing to the appearance of the ventilator, the efficiency by which the ventilator panel is sealed in closed position, or particularly in respect to its strength. It adds considerably to the cost of manufacture of the window unit in point of cost of materials and assembly.

An object of the present invention is therefore to improve a ventilator window assembly, and a component ventilator panel thereof, of lowered cost of manufacture, yet without sacrifice of desired adaptability of the panel and assembly to be sturdily mounted in a fixed frame for swinging movement, and to be properly latched in closed position. These results are accomplished by eliminating in its entirety the usual elongated glass retaining channel encompassing the forward, top and bottom margins of the transparent ventilator panel, and by substituting for this channel one or more simple, plate-like members, preferably metallic, on which suitable panel pivoting and latching provisions are mounted.

The assembly of the mounting members or plates is carried out in the simplest possible manner, i. e., by cementing the same directly to a side surface of the transparent window panel itself. The location of the members is such that the pivoting and latching elements will project to one side or the other of the panel for co-action with the fixed frame, being welded direct to a side of the metal plates in the illustrated form. The securement of the plates or equivalent elements to the panel may be effected by a well known type of thermo-setting cement, but alternative methods of bonding are practical, for example by firing on a silver solder paste as an agent for the bond. The bond which results between the mounting plate and transparent panel has ample strength to resist rupture under any foreseeable impact or stress. Other than at the area of direct bonded adhesion, the margins of the transparent ventilator panel are completely exposed at their edges; and the exposed edges are either overlapped or edge-engaged by conventional flexible rubber weather strip mounted on the fixed frame for the ventilator panel. This eliminates entirely the "blind spot" at the forward edge of the ventilator panel which is represented by a glass retainer frame and, in the case of a non-overlapped weather strip, the zone at the edge which is free of overlap.

The foregoing as well as other objects will be made more apparent as this discussion proceeds, especially when considered in connection with the accompanying drawings, wherein:

Fig. 1 is a fragmentary view in side elevation, of a ventilator panel in accordance with the invention, as assembled in operative pivoted relation to a fixed frame of a vehicle body window;

Figs. 2 and 3 are, respectively, somewhat enlarged fragmentary views taken on lines 2—2 and 3—3 of Fig. 1;

Figs. 4 and 5 are, respectively, fragmentary views in somewhat enlarged scale along lines 4—4 and 5—5 of Fig. 1.

The improved ventilator window assembly or unit, as chosen for illustration, comprises a fixed frame 10 of conventional type, including a vertically extending division pillar or bar 11 adapted to be fixedly installed on a vehicle door (not shown) forwardly of a vertically sliding window of the latter, a top bar 12, a front bar 13 and a bottom bar 14. These elements are of channeled cross-section, and they receive and fixedly support a length of flexible rubber weather strip 15. The weather strip 15 is of varying cross-sectional contour along its length and is fitted and clamped by the frame bars 11, 12, 13 and 14 about the perimeter of a ventilator frame opening 16 defined by the bars.

A transparent ventilator panel 17 disposed in opening 10 is the final component of the window assembly. As shown in Fig. 1, it is of a conventional outline, in conformity to that of frame 10, and it is fabricated of glass or equivalent transparent sheeting.

The present invention does not deal with structural features of fixed frame 10 nor, in particular, its sealing provisions, save as they are specially related to features of panel 17. Hence such structural features of the frame are neither illustrated nor described in greater detail.

Transparent panel 17 is mounted for swinging movement in frame 10 about an approximately vertical axis by means of a bottom mounting plate 18 having pivoting and latching provisions associated therewith, to be described, and by a top mounting plate 19 having generally similar pivoting provisions, to be described. The forward outer edge margin of panel 17 is exposed, being free from the usual metal retainer channel, between the plate members 18—19, as well as along its rear margin adjacent division bar 11. The weather strip 15 has direct overlapping and sealing contact, in the embodiment chosen for illustration, with the outer face of panel 17 adjacent its exposed edges, as illustrated particularly in Fig. 3.

Reference should be made in Figs. 1, 4 and 5 for the construction of bottom pivot mounting plate 18. It is of somewhat elongated character, in the direction of the length of the bottom frame bar 14, extending from the rear edge of panel 17, adjacent which an operating and latching device 20 is mounted on the plate, to a point intermediate the front-rear width of panel 17, at which a bottom pivot unit 21 is disposed. Plate 18 is preferably fabricated of a weldable metal, and is adhesively secured, as by cementing fusion bonding, etc., along its entire area to the inner surface of panel 17. This is done by means of a suitable cement, silver solder or other bonding agent capable of making a very strong joint between the glass or plastic composition of panel 17 and the metal part. The plate members simply illustrate one type of arrangement bonded direct to the surface of panel 17 for the purpose of mounting operating parts. Considerable latitude of variation of the mounting means is possible. For example, if a crank type operator is to be associated with panel 17 the member 18 may consist only of a lower pivot member bonded direct to the glass in accordance with the invention. A similar change in the mounting means for the other parts, such as the upper panel pivot, is contemplated. Hence reference in the description to the "plate-like" character of members 18, 19 is simply illustrative.

The bonding material is indicated at 22, an example suitable for the purpose being a dry epoxy resin film capable of being set and cured under heat. Other suitable liquid cements, fusion bond and/or solder agents are available, as indicated above, and the choice thereof will be governed by factors such as their strength, cost, etc.

As indicated in the illustrative form latch operator 20 and pivot unit 21 are secured to plate 18 by welding. Referring to Fig. 4, the latching device 20 is of entirely conventional nature, including an inner mounting stud 23, a latch handle 24 received in telescoped, relatively rotatable relation thereon, and a latch release pin 25. In mounting the stud 23 the same is integrally and rigidly secured on plate 18 by a simple projection weld at 26 to the outer surface of plate 18, affording a very strong bond between the plate and stud.

Plate 18 is widened somewhat at its rear to receive device 20 in the above manner, but adjacent its forward extremity it is of lesser width, in the interest of improved appearance. A vertical pivot pin 27 (Fig. 5) is secured by a further projection welded joint 26 to the inner surface of plate 18, and in order to afford a suitably large area for the weld the upper extremity of pin 27 is flattened and widened at 28 (see Fig. 5).

Pivot pin 27 extends downwardly through the weather strip 15 and through an opening in the bottom frame bar 14. Such pivot pin 27 is supported by a downwardly offset bracket 29 appropriately secured to the bottom bar 14. The pivot pin 27 is provided below the bottom frame bar 14 with an annular shoulder or abutment 27a and carries at its lower end an adjustable nut 33. The bracket 29, suitable washers 30 and 31 respectively above and below said bracket, and a coil spring 32 are sleeved on the pivot pin 27 between the shoulder 27a and nut 33.

The construction described provides an exceedingly simple means for securing bottom pivot pin 27 to transparent panel 17, involving a minimum in cost of parts and assembly, and the strength of the cement bond 22 between metal mounting plate 18 and the flattened head 28 of pin 27 amply sustains stresses and impacts imposed on the panel.

Details of the attachment of the upper mounting plate 19 are depicted in Figs. 1 and 2. It, like the lower mounting plate 18, is fabricated of a weldable metal in a simple, somewhat elongated rectangular form. The plate 19 is adhesively cemented or otherwise bonded at 35 to panel 17, and a socket cup 36 in axial alignment with bottom pivot pin 27 is welded to the inner surface of plate 19.

A top pivot pin 37 is pivotally received in the socket cup 36 and is supported on the top bar 12 of the frame. To this end the pivot pin 37 is in the form of a short length of wire rod stock which is flattened and bent to form an L-shaped arm 38. The horizontal portion 38a of this arm extends over the top bar 12 of the fixed frame and is secured thereto by a screw 40. An upper pivot socket of the same efficiency and low production cost as the mount for bottom pivot pin 27 is thus produced.

Fig. 3 illustrates the direct overlapping engagement of the weather strip 15 with the exposed outer face of the panel 17 when the latter is in closed position relative to the frame 10. In accordance with the invention this relation may exist around the entire forward edge of panel 17. The weather strip 15 also overlaps the pivots 27 and 37 and the mounting plates 18 and 19 (Figs. 2 and 5). As an alternative mentioned above, the weather strip 15 may also abut the edge of the panel margins. Inward extensions 42 of the top and bottom frame bars 12 and 14 also overlap the plates 18 and 19 to supplement the seal when the panel is in closed position, as well as to improve the appearance of the installation as a whole.

By reference to Figs. 2 and 5 it will be seen that the invention enables the pivot pins 27 and 37 to be offset to one side of the panel 17, so that an effective seal between the panel 17 and the weather strip 15 may be obtained when the panel 17 is in closed position relative to the fixed frame 10.

What I claim as my invention is:

1. A ventilator window assembly comprising a fixed supporting frame having top and bottom bars, a weather strip fixed to and projecting inwardly from said frame, an unframed transparent panel within and movable relative to said fixed frame, all edges of said panel being completely exposed, one side of said panel adjacent said exposed edges abutting and having overlapping sealing engagement with the inwardly projecting portions of said weather strip, upper and lower substantially aligned pivot pins for said panel located in offset relation to the opposite side of said panel, a supporting bracket for the lower pivot pin located below and fixed to the bottom bar of said fixed frame, the upper pivot pin having a substantially L-shaped arm, the horizontal portion of said arm extending over and being secured to the top bar of said fixed frame, said lower pivot pin extending upwardly through the bottom bar of said fixed frame and extending upwardly through the bottom bar of said fixed frame and extending upwardly through a portion of said weather strip fixed to said bottom bar, upper and lower substantially flat mounting plates between said panel and said upper and lower pivots, said mounting plates being bonded in surface to surface relation to said panel, the lower mounting plate being welded to the upwardly extending portion of said lower pivot pin, and a socket cup welded to the upper mounting plate and pivotally receiving the upper pivot pin.

2. A ventilator window assembly comprising a fixed supporting frame having top and bottom bars, a weather strip fixed to and projecting inwardly from said frame, an unframed transparent panel within and movable relative to said fixed frame, all edges of said panel being completely exposed, one side of said panel adjacent said exposed edges abutting and having overlapping sealing engagement with the inwardly projecting portions of said weather strip, upper and lower substantially aligned pivot pins for said panel located in offset relation to the opposite side of said panel, a supporting bracket for the lower pivot pin located below and fixed to the bottom bar of said fixed frame, the upper pivot pin having a portion extending over and secured to the top bar of said fixed frame, said lower pivot pin extending upwardly through the bottom bar of said fixed frame and extending upwardly through a portion of said weather strip fixed to said bottom bar, upper and lower substantially flat mounting plates between said panel and said upper and lower pivots, said mounting plates being bonded in surface to surface relation to said panel, the lower mounting plate being fixed to the upwardly extending portion of said lower pivot pin, and a socket cup fixed to the upper mounting plate and pivotally receiving the upper pivot pin.

3. A ventilator window assembly comprising a fixed supporting frame having top and bottom bars, a weather strip fixed to and projecting inwardly from said frame, an unframed transparent panel within and movable relative to said fixed frame, all edges of said panel being completely exposed, one side of said panel adjacent said exposed edges abutting and having overlapping sealing engagement with the inwardly projecting portions of said weather strip, upper and lower substantially aligned pivot pins for said panel located in offset relation to the opposite side of said panel, a supporting bracket for the lower pivot pin located below and fixed to the bottom bar of said fixed frame, the upper pivot pin having a substantially L-shaped arm, the horizontal portion of said arm extending over and being secured to the top bar of said fixed frame, said lower pivot pin extending upwardly through the bottom bar of said fixed frame and extending upwardly through a portion of said weather strip fixed to said bottom bar, upper and lower substantially flat mounting plates between said panel and said upper and lower pivots, said mounting plates being bonded in surface to surface relation to said panel, the lower mounting plate being welded to the upwardly extending portion of said lower pivot pin, a socket cup welded to the upper mounting plate and pivotally receiving the upper pivot pin, and an operating and latching device for said panel having a mounting stud welded to said lower mounting plate.

References Cited in the file of this patent

UNITED STATES PATENTS

| | | |
|---|---|---|
| 2,114,538 | Lohrman | Apr. 19, 1938 |
| 2,198,911 | Ewing et al. | Apr. 30, 1940 |
| 2,518,152 | Kramer | Aug. 8, 1950 |
| 2,584,653 | Alpert | Feb. 5, 1952 |
| 2,587,288 | Chapman | Feb. 26, 1952 |